United States Patent
Pena

(10) Patent No.: US 11,553,316 B2
(45) Date of Patent: Jan. 10, 2023

(54) METHOD AND APPARATUS FOR STORING AND SENDING A COMPUTER LOCATION

(71) Applicant: Angel Pena, New York, NY (US)

(72) Inventor: Angel Pena, New York, NY (US)

(*) Notice: Subject to any disclaimer, the term of this patent is extended or adjusted under 35 U.S.C. 154(b) by 79 days.

(21) Appl. No.: 15/980,318

(22) Filed: May 15, 2018

(65) Prior Publication Data
US 2018/0338227 A1 Nov. 22, 2018

Related U.S. Application Data

(60) Provisional application No. 62/506,930, filed on May 16, 2017.

(51) Int. Cl.
| | |
|---|---|
| *H04W 24/00* | (2009.01) |
| *H04W 4/18* | (2009.01) |
| *H04L 65/1073* | (2022.01) |
| *H04W 4/029* | (2018.01) |
| *G06F 3/0481* | (2022.01) |
| *H04L 51/10* | (2022.01) |
| *H04L 65/75* | (2022.01) |
| *H04L 51/52* | (2022.01) |
| *H04L 51/222* | (2022.01) |

(52) U.S. Cl.
CPC .......... *H04W 4/185* (2013.01); *G06F 3/0481* (2013.01); *H04L 51/10* (2013.01); *H04L 65/1073* (2013.01); *H04L 65/762* (2022.05); *H04W 4/029* (2018.02); *H04L 51/222* (2022.05); *H04L 51/52* (2022.05)

(58) Field of Classification Search
CPC ........ H04W 4/12; H04W 4/14; H04W 64/00; H04M 1/72519
USPC ........................ 455/412.1, 456.1, 466, 550.1
See application file for complete search history.

(56) References Cited

U.S. PATENT DOCUMENTS

| | | | |
|---|---|---|---|
| 8,239,840 B1 | 8/2012 | Czymontek | |
| 9,185,062 B1* | 11/2015 | Yang | ..................... G06F 3/0485 |
| 2004/0205490 A1* | 10/2004 | Haeuptle | ........... G06F 17/30887 |
| | | | 715/205 |
| 2006/0114336 A1 | 6/2006 | Liu | |
| 2012/0096071 A1* | 4/2012 | Murphey | ................... G06F 8/63 |
| | | | 709/203 |
| 2012/0258726 A1 | 10/2012 | Bansal et al. | |

(Continued)

OTHER PUBLICATIONS

International Search Report for Serial No. PCT/US2018/032768 dated Aug. 8, 2018.

*Primary Examiner* — Matthew W Genack
(74) *Attorney, Agent, or Firm* — McCormick, Paulding & Huber PLLC

(57) ABSTRACT

A method and apparatus for storing a computer location including the steps of initiating, by a user of a device, a capture sequence, wherein the device includes a processor and a display screen, obtaining, by the processor, visual data corresponding to an image displayed on the display screen at the time of the initiating step, obtaining, by the processor, location data corresponding to a computer location accessed by the device, and storing, by the processor, the visual data and the location data as associated data such that the visual data and the location data are associated with each other. A method and apparatus for sending the computer location further including the step of sending, by the first device, the associated data to a second device, wherein the second device includes a second processor and a second display screen.

11 Claims, 11 Drawing Sheets

(56) References Cited

U.S. PATENT DOCUMENTS

| | | |
|---|---|---|
| 2012/0327265 A1 | 12/2012 | Arujunan et al. |
| 2013/0027552 A1 | 1/2013 | Guzik |
| 2013/0041941 A1 | 2/2013 | Tomasic et al. |
| 2014/0012979 A1* | 1/2014 | Seo .................. H04L 67/36 709/224 |
| 2014/0033058 A1* | 1/2014 | Perotti .................. G08C 17/00 715/740 |
| 2014/0364158 A1* | 12/2014 | Hwang ................ H04W 4/185 455/466 |
| 2015/0119080 A1 | 4/2015 | Husain et al. |
| 2015/0371173 A1* | 12/2015 | Jalali .............. G06Q 10/063112 705/7.14 |
| 2016/0086228 A1 | 3/2016 | Babb et al. |
| 2016/0105318 A1 | 4/2016 | Bradley et al. |
| 2016/0216871 A1 | 7/2016 | Stamatiou |
| 2017/0351477 A1* | 12/2017 | Su ...................... G06F 3/04842 |

* cited by examiner

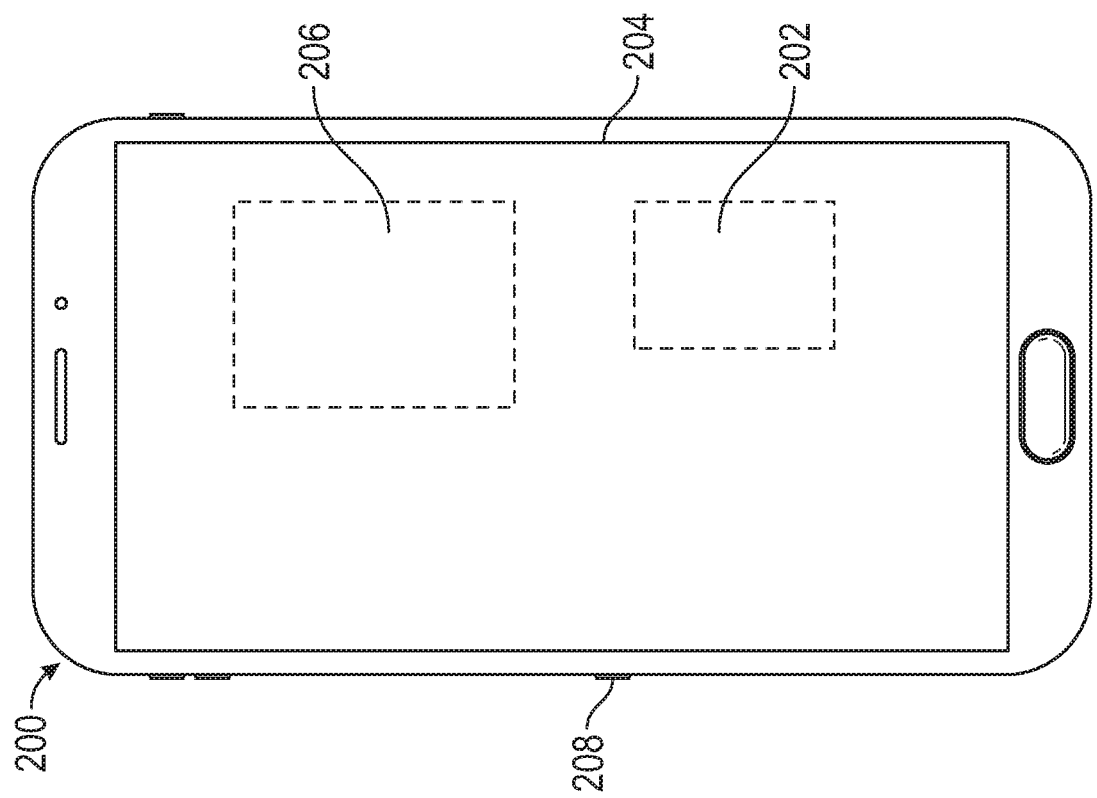
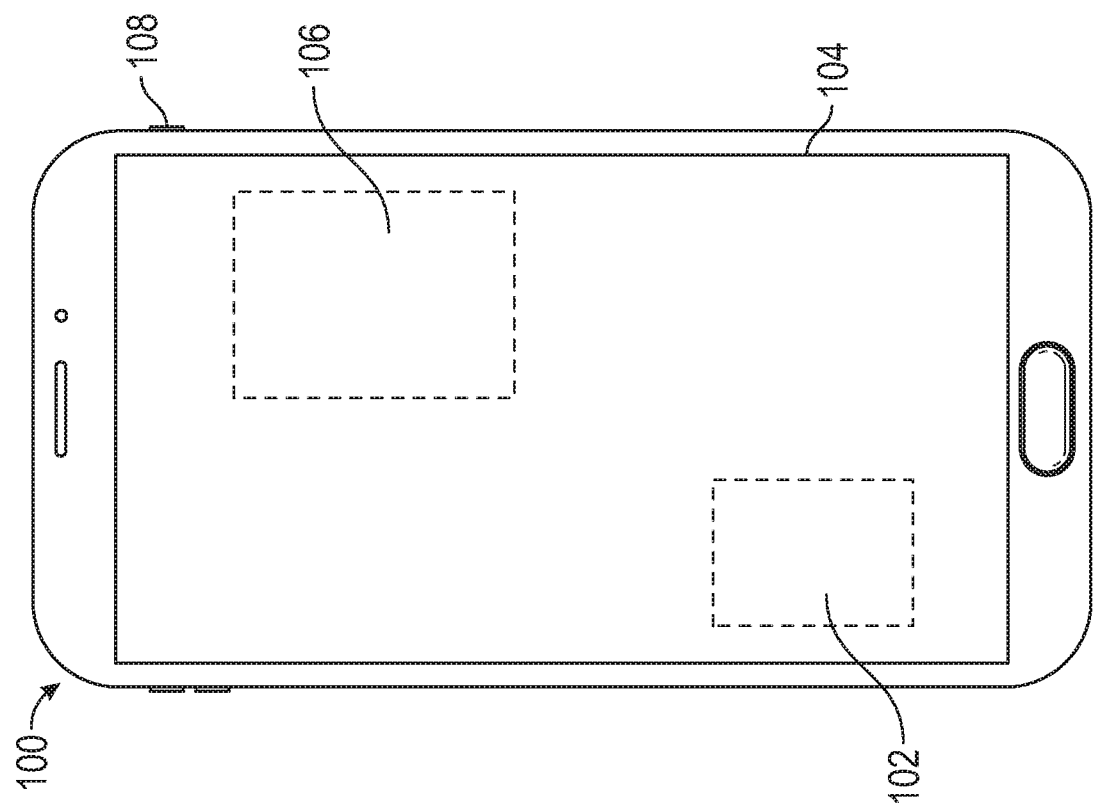

METHOD AND APPARATUS FOR STORING AND SENDING A COMPUTER LOCATION

CROSS-REFERENCE TO RELATED APPLICATIONS

This application claims priority to U.S. Provisional Patent Application No. 62/506,930, filed May 16, 2017, which is hereby incorporated by reference in its entirety.

FIELD OF INVENTION

The present disclosure relates generally to methods and apparatuses for storing and sending a computer location.

SUMMARY

The present application is directed to methods and apparatuses for storing and sending a computer location with one or more devices. The methods and apparatuses according to the present disclosure advantageously allows a user of a device to substantially simultaneously capture visual data and location data, and then associate the obtained data for later reference or for sending to another device. In embodiments, a user may provide an activation input to a device which causes the device to obtain visual data corresponding to an image being displayed on the device ("screenshot") and also obtain location data that corresponds to a computer location that was the origin for the visual data. According to embodiments the present disclosure, the visual data and location data may automatically be stored and associated for a seamless user experience.

A method for storing a computer location according to embodiments of the present disclosure includes the steps of initiating a capture sequence of a device, wherein the device comprises a processor and a display screen, obtaining, by the processor, visual data corresponding to an image displayed on the display screen at the time of the initiating of the capture sequence, obtaining, by the processor, location data corresponding to a computer location accessed by the device, and storing, by the processor, the visual data and the location data as associated data such that the visual data and the location data are associated with each other.

A method for storing and sending a computer location according to embodiments of the present disclosure include initiating a capture sequence of a first device, wherein the first device comprises a first processor and a first display screen, obtaining, by the first processor, visual data corresponding to an image displayed on the first display screen at the time of the initiating step, obtaining, by the first processor, location data corresponding to a computer location accessed by the first device, storing, by the first processor, the visual data and the location data as associated data such that the visual data and location data are associated with each other, and sending, by the first device, the associated data to a second device, wherein the second device comprises a second processor and a second display screen.

A device for storing a computer location according to embodiments of the present disclosure includes a processor, a display screen, an input element, and a storage medium, wherein the device is configured to perform a capture sequence based on a detection, by the processor, of an activation input performed by a user on the input element. The capture sequence includes obtaining, by the processor, visual data corresponding to an image displayed on the display screen at the time of the detection of the activation input by the processor, obtaining, by the processor, location data corresponding to a computer location accessed by the device, and storing, by the processor, the visual data and the location data as associated data in the storage medium such that the visual data and the location data are associated with each other.

BRIEF DESCRIPTION OF THE DRAWINGS

FIG. 1 shows a first device according to embodiments of the present disclosure;

FIG. 2 shows a second device according to embodiments of the present disclosure;

DESCRIPTION

Figure 3:
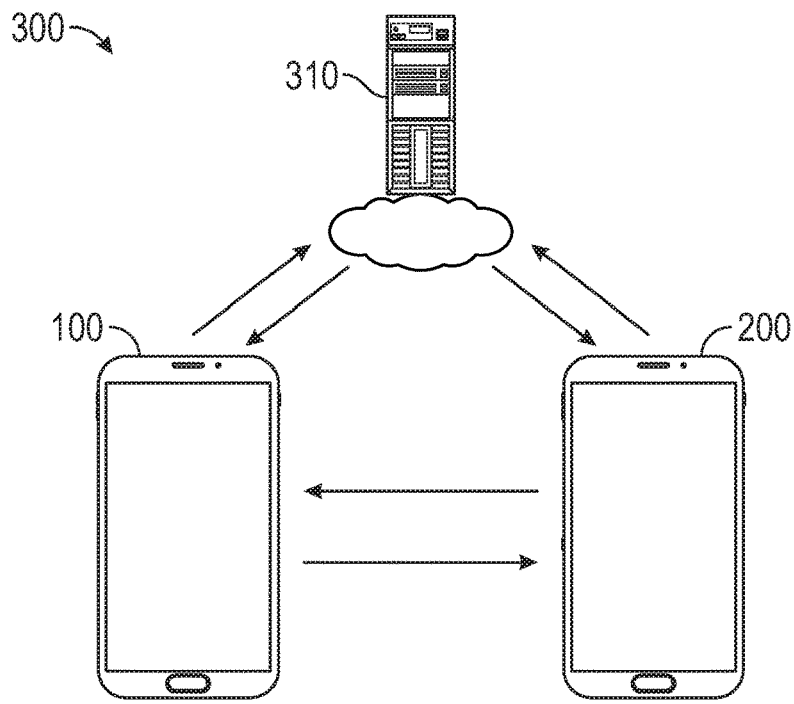
FIG. 3 shows a system according to embodiments of the present disclosure, the system including the first device shown of FIG. 1 and the second device shown of FIG. 2.

Before the various embodiments are described in further detail, it is to be understood that the present disclosure is not limited to the particular embodiments described. It will also be understood that the methods and apparatuses described herein may be adapted and modified as appropriate for the application being addressed and that the devices described herein may be employed in other suitable applications, and that such other additions and modifications will not depart from the scope thereof.

Although various features have been shown in different figures for simplicity, it should be readily apparent to one of skill in the art that the various features may be combined without departing from the scope of the present disclosure.

FIG. 1 shows an exemplary first device 100 according to embodiments of the present disclosure. The device 100 includes a processor 102, a display screen 104, a computer readable storage medium 106 (i.e. memory or any other non-transitory computer readable storage medium) and an input element 108. The processor 102 is operatively connected to the display screen 104 so that the processor 102 can instruct the display screen 104 to display an image. The processor 102 is operatively connected to the storage medium 106 so that the processor can read and/or write to and from the storage medium 106. The input element 108 is operable by a user of the device 100. The processor 102 is operatively connected to the input element 108 to receive input generated by the user.

FIG. 2 shows an exemplary second device 200 according to embodiments of the present disclosure. The second device 200 is similar to the first device 100 in that the second device 200 also includes a processor 202, a display screen 204, a computer readable storage medium 206 (i.e. memory or any other non-transitory computer readable storage medium) and an input element 208. The processor 202 is operatively connected to the display screen 204 so that the processor 202 can instruct the display screen 204 to display an image. The processor 202 is operatively connected to the storage medium 206 so that the processor can read and/or write to and from the storage medium 206. The input element 208 is operable by a user of the device 200. The processor 202 is operatively connected to the input element 208 to receive input generated by the user.

The processors 102, 202 of the devices 100, 200 are configured to detect whether an activation input has been performed by a user on the input element 108, 208. If the processors 102, 202 detect an activation input being performed, the processors 102, 202 are configured to perform a capture sequence without additional input from the user beyond an activation input, which is discussed in greater detail below.

The devices 100, 200 are configured to access the internet and/or an intranet via network technology, such as ethernet, fiber optic cable, Wi-Fi, cellular networks, and the like. The devices are configured to send and receive data with other devices through methods such as email, SMS text messaging, peer-to-peer data exchange, and other communication exchange methods. The devices 100, 200 may have software application(s) for accessing the internet or intranet such as an internet browser, web portal, social media application, and the like.

While the devices 100, 200 are shown in FIGS. 1 and 2 as smartphones, the devices 100, 200 may be different computer or electronic devices, such as, without limitation, tablets, desktop computers, laptops, virtual reality goggles, and the like. While the input elements 108, 208 are shown as buttons that are capable of receiving physical input from a user, the input elements 108, 208 can be configured as other types of input elements, such as, for example, a microphone (not shown) configured to receive audible input from a user, a touch display (not shown—may be unitary with the display screen 104, 204 or a separate layer of the device 100, 200 screen) configured to receive touch input from a user, an accelerometer (not shown) configured to receive movement input of the device 100, 200 generated by a user, and the like.

FIG. 3 shows an exemplary system 300 according to methods and apparatuses of the present disclosure. The system 300 comprises the first device 100 of FIG. 1 and the second device 200 of FIG. 2, and an optional server 310 that is remote from the devices 100, 200. As indicated by arrows, the first device 100 is configured to communicate with the second device 200, and vice-versa, and/or both devices 100, 200 are configured to communicate with the server 310, and vice-versa. For the purposes of the present disclosure, the term "communicate" means the ability to transmit and receive data via one or more networks such as, for example, internet, intranet, cellular network, Wi-Fi, Bluetooth, near-field communication, and the like.

Figure 4A:
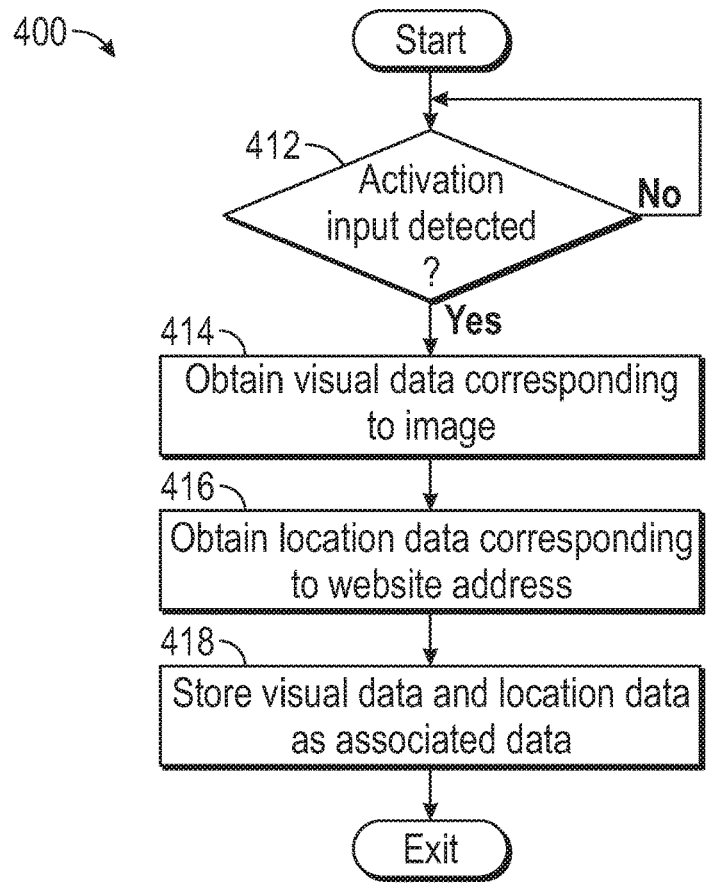
FIG. 4A shows a flow diagram of a method for storing a computer location according to embodiments of the present disclosure.

FIG. 4A shows a flow diagram of an exemplary method 400 for storing a computer location according to the present disclosure. The method 400 is capable of being performed with a computer or electronic device, such as, for example, the first device 100 of FIG. 1 and/or the second device 200 of FIG. 2. The method 400 starts at block 412 with detecting, by the processor 102, 202, whether an activation input has been performed on an input element 108, 208 by a user. If no activation input is detected (i.e. "No"), then the method 400 loops at block 416 to continue to detect for an activation input. If an activation input is detected (i.e. "Yes"), then the method 400 proceeds to block 414, where the processor 102, 202, obtains visual data corresponding to an image displayed on the display screen 104, 204 at the time of the detection of an activation input at block 412 (i.e. the active screen at the time of activation input). Practically speaking, given that the activation input must be detected and processed by the processor before the processor can recognize the instruction to obtain the visual data, the visual data may be obtained slightly after the time of the activation input. However, given that the practical time for accomplishing these steps may be relatively short from a user's perspective, such a short time delay should be considered to be "at the time" of the activation input being detected. Then, at block 416, the processor 102, 202 obtains location data corresponding to a computer location accessed by the device 100, 200. The location data may or not be visible to the user. Then, at block 418, the processor 102, 202 stores the visual data and the location data as associated data such that the visual data and the location data are associated with each other. Then, the method 400 proceeds to exit the process.

Although the method 400 is shown and described as the processor first obtaining visual data at block 414 and then obtaining location data at block 416, it is within the scope of the present disclosure for the processor to first obtain the location data (block 416) and then obtain the visual data (block 414). Alternatively, the visual data and location data may be obtained substantially simultaneously.

Figure 4B:
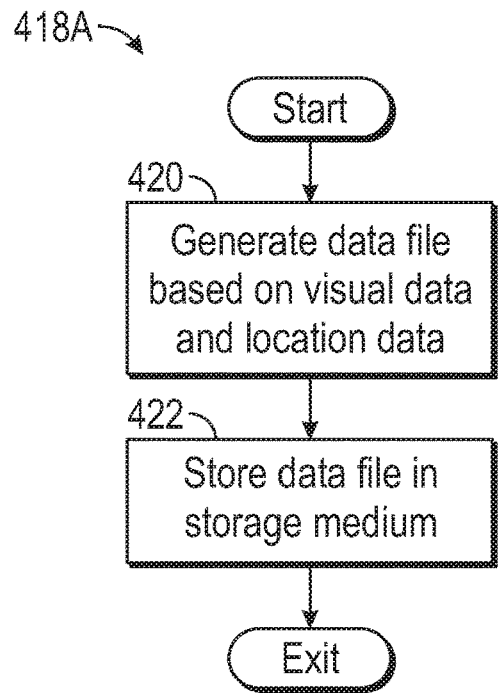
FIG. 4B shows a flow diagram of a portion of the method shown in FIG. 4A according to embodiments of the present disclosure.

FIG. 4B shows a flow diagram of a portion 418A of the method 400 for performing the step of storing the visual data and the location data as associated data such that the visual data and the location data are associated with each other at block 418, discussed above. In this embodiment, for this portion 418A of the method 400, at block 420, the processor 102, 202 generates a data file based on the visual data and the location data. Then, at block 422, the data file is stored in the storage medium 106, 206 of the device 100, 200. Then, the method 418A exits the process.

Figure 4C:
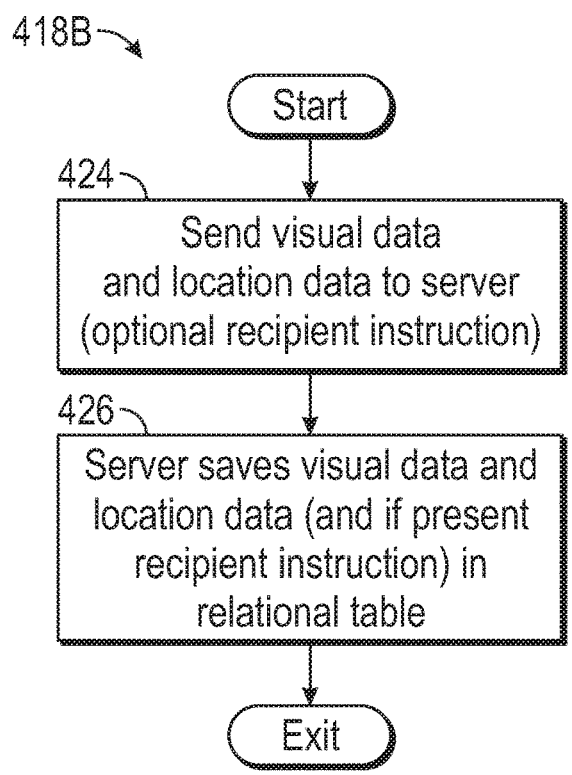
FIG. 4C shows a flow diagram of a portion of the method shown in FIG. 4A according to embodiments of the present disclosure.

FIG. 4C shows a flow diagram of another exemplary portion 418B of the method 400 for performing the step of storing the visual data and the location data as associated data such that the visual data and the location data are associated with each other at block 418, discussed above. In embodiments, for this portion 418B of the method 400, at block 424, the device 100, 200 sends the visual data and the location data to the server 310 (FIG. 3). The device may also optionally send an instruction to the server 310 indicating a recipient. At block 426, the server 310 saves the visual data and the location data (and, if included, the intended recipient instruction) in a table such that the storage of the data in the table thereby associates the visual data with the location data (and, if included, the intended recipient instruction).

Figure 5:
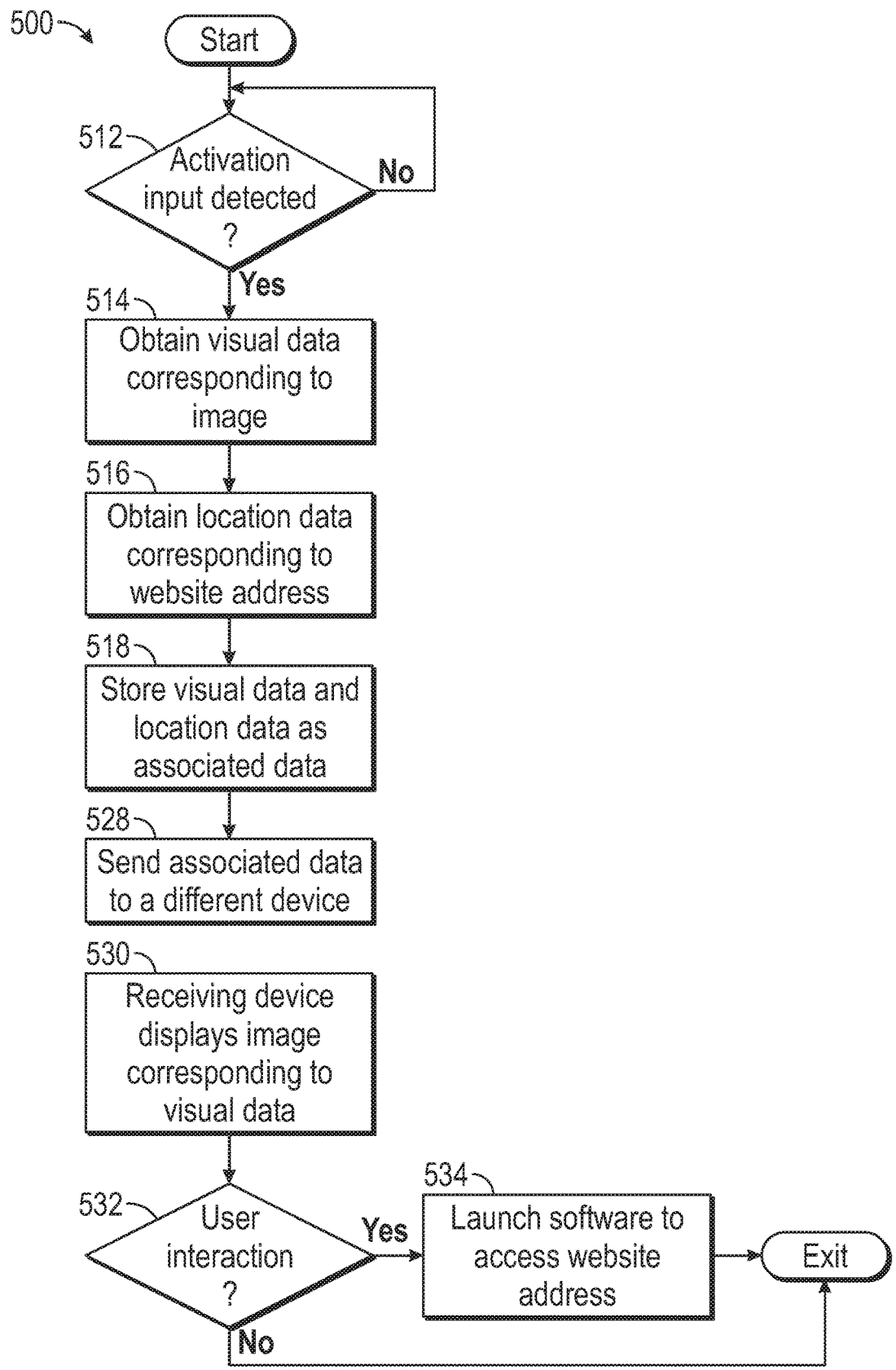
FIG. 5 shows a flow diagram of a method for storing and sending a computer location according to embodiments of the present disclosure.

FIG. 5 shows a flow diagram of an exemplary method 500 for storing and sending a computer location according to the present disclosure. The method 500 at blocks 512, 514, 516, 518 is substantially identical to the method 400 for storing a computer location discussed above, and, thus, those portions will not be discussed in detail here. After storing the visual data and the location data as associated data at block 518, the method proceeds to block 528, where the device 100, 200 sends the associated data to a different device 100, 200. The recipient of the associated data can be selected by the user or a predetermined recipient(s). Then, at block 530, the receiving device 100, 200 of the associated data displays the image corresponding to the visual data contained in the associated data. Then, at block 532, the processor 102, 202 detects whether there is user "interaction" with the image via the receiving device 100, 200, indicating a desire to launch an internet browser, web portal, social media application, or the like, to access the computer location corresponding to the location data contained in the associated data. The user can "interact" with the image by touching the image if the display screen 204 is a touch screen, accessing a menu of the device or by other user input through the user input element 108, 208 or otherwise engaging the image via other device 100, 200 elements. If Yes, the method 500 proceeds to block 534 to launch a software application to access the computer location (and process the access request through a Domain Name Server "DNS" if necessary), and then the method 500 proceeds to exit the process. If No, the process exits without launching a software application to access the computer location.

If the associated data was stored by generating a data file as described above in connection with the portion 418A of the method 400 shown in FIGS. 4A and 4B, then the generated data file can be sent at block 528 to a recipient device(s) 100, 200 directly or indirectly through known network technologies. Once the recipient device(s) 100, 200 receives and stores the data file, the recipient device 100, 200 can access the visual data of the data file to display an image on the display screen 104, 204 for a user. As discussed above, if desired, the user can interact with the image on the display screen 104, 204 to access the location data of the associated data, which will automatically open an internet browser, web portal, social media application, or the like, and access the computer location corresponding to the location data.

Figure 6:
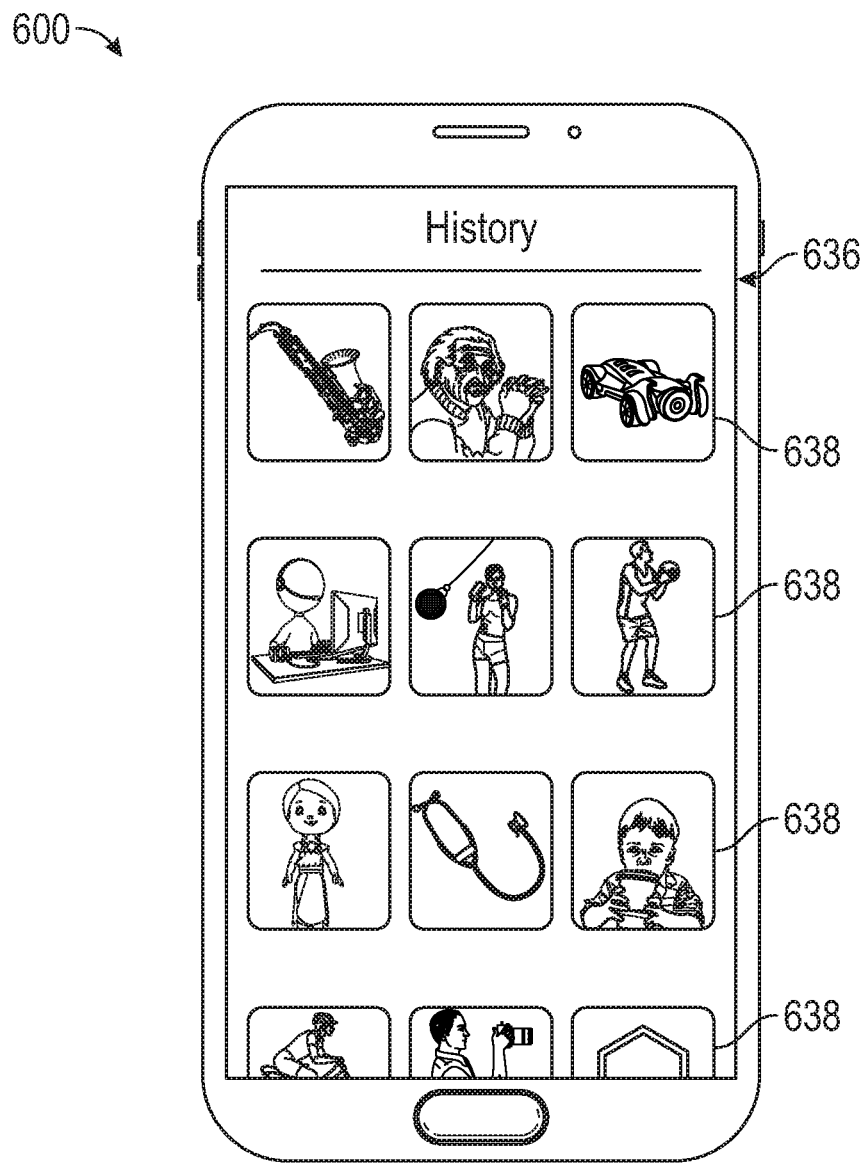
FIG. 6 shows a device according to embodiments of the present disclosure.

If the associated data was stored by sending the associated data to a server 310 (FIG. 3) as described above in connection with the portion 418B of the method shown in FIGS. 4A and 4C, when the recipient device 100, 200 accesses the server 310, the recipient device 100, 200 will have access to an image path where the visual data of the associated data is stored in a table of the server 310 as well as the location data. Once the device 100, 200 has access to the visual data, the device 100, 200 can display the image corresponding to the visual data on the display screen 104, 204 and the user can interact with the image in order to access the computer location corresponding to the location data, as discussed above Referring to FIG. 6, devices according to embodiments of the present disclosure may be configured to store the associated data in a "history" viewing page. As shown in FIG. 6, a device 600 may show history page 636 having a plurality of stored associated data displayed as screenshot images 638 corresponding to the visual data of each associated data displayed as thumbnail images 638. The user can scroll through and view the thumbnail images 638. If the user wishes to access the computer location corresponding to where the visual data was accessed from by the device 600, the user can interact with the image 638 in order to launch an internet browser, web portal, social media application, and the like, that automatically accesses the computer location corresponding to the location data associated with the visual data of the image 638 interacted with by the user. The user can select a thumbnail image 638 to proceed to a larger view or full screen view of the image 638.

Figure 7B:
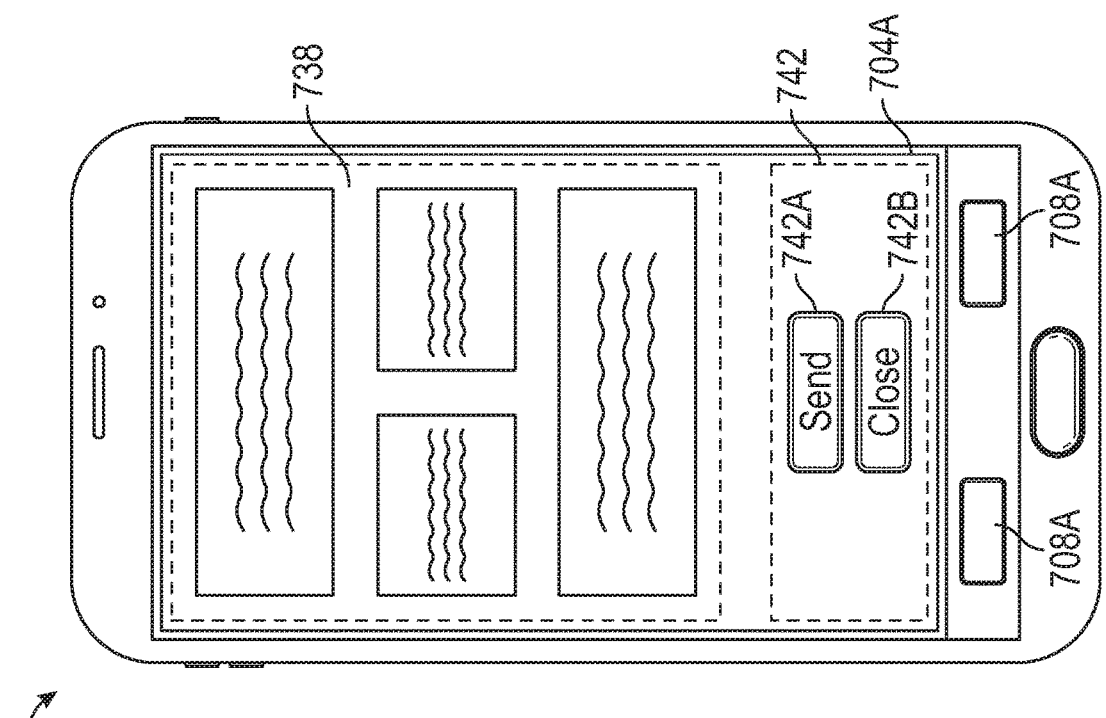
FIG. 7B shows the first device of FIG. 7A during the use case of FIG. 7A according to embodiments of the present disclosure.
Figure 7A:
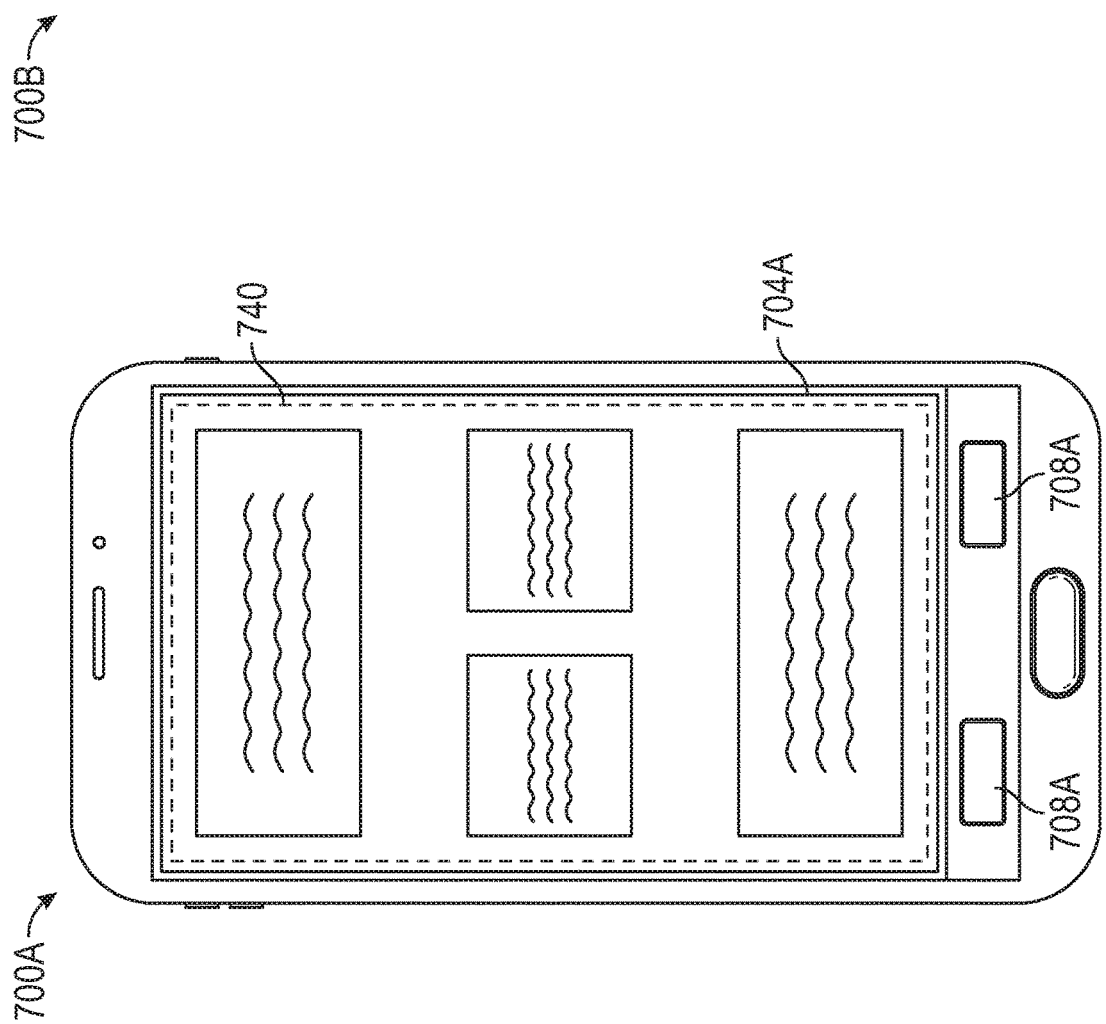
FIG. 7A shows a first device during a use case according to embodiments of the present disclosure.
Figure 7D:
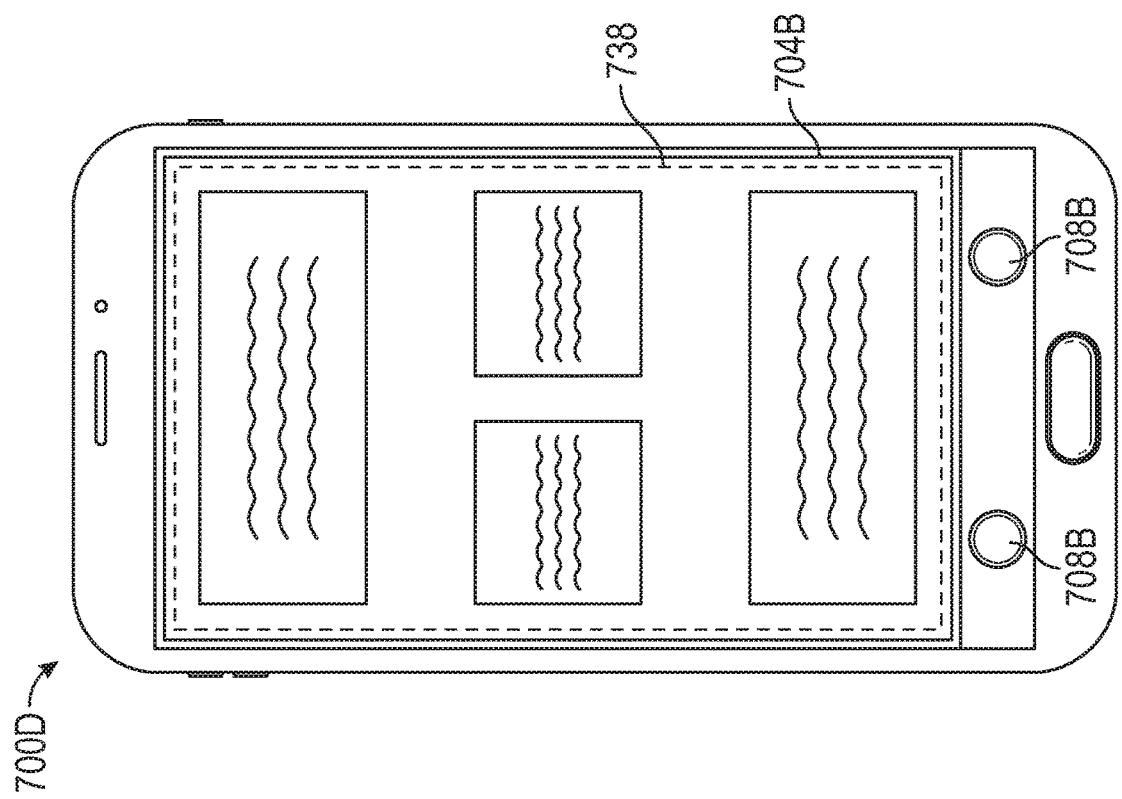
FIG. 7D shows a second device during the use case of FIGS. 7A-7C according to embodiments of the present disclosure.
Figure 7C:
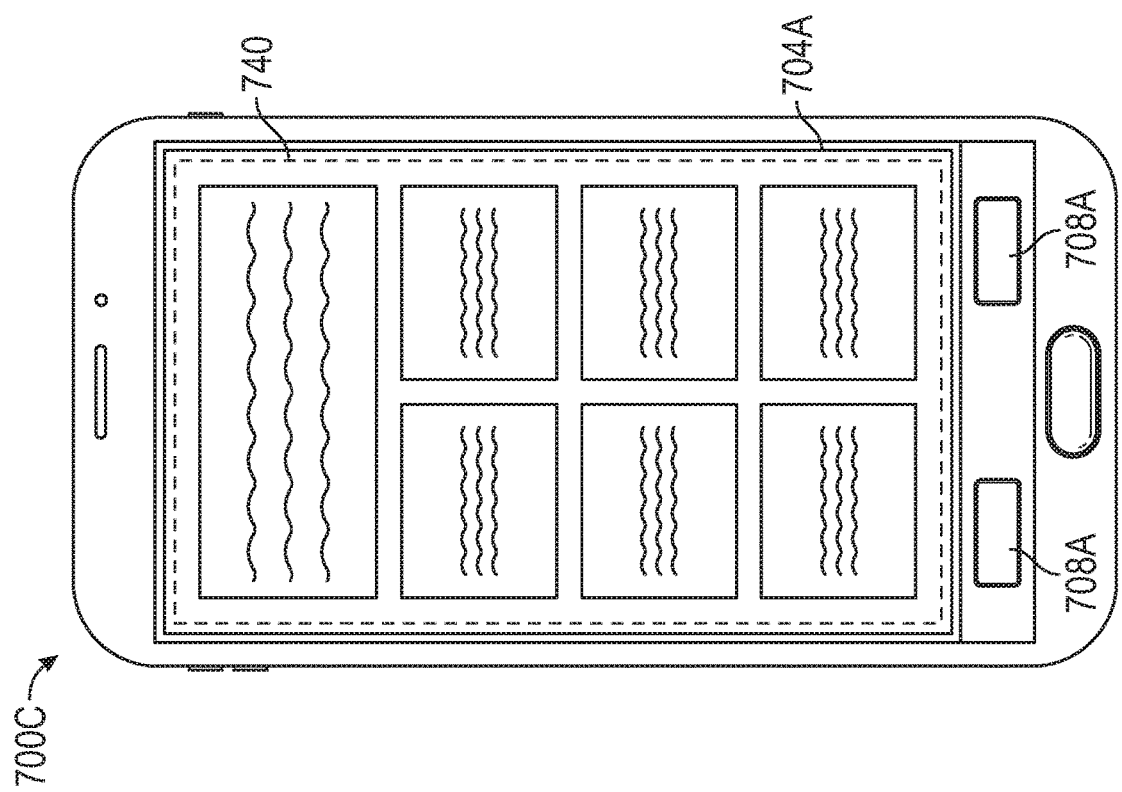
FIG. 7C shows the first device of FIGS. 7A and 7B during the use case of FIGS. 7A and 7B according to embodiments of the present disclosure.

FIGS. 7A-C show an exemplary use case of apparatuses and methods according to embodiments of the present disclosure. FIG. 7A shows a first smartphone device 700A comprising a processor 102 (FIG. 1), a display screen 704A, a computer readable storage medium 106 (FIG. 1) and input elements 708A. Displayed on the display screen 704 is an image 740 of an active screen generated by an internet browser software application running on the device 700A, which was generated based on visual data obtained from a computer location accessed by the internet browser software application running on the device 700A, in this case, a website address.

FIG. 7B shows the device 700A shown in FIG. 7A after the user engaged the input element(s) 708 in a predetermined manner that the processor 102 recognized as corresponding to an activation input. Having stored the visual data corresponding to the active screen image 740 and the location data corresponding with the website address accessed by the device 700A as associated data in accordance with a method 400 described above, the display screen 704 shows a screenshot image 738 along with a prompt window 742 which allows the user to send the associated data to a recipient in accordance with a method 500 described above by selecting the send button 742A or return to the internet browsing application by selecting the close button 742B. If the user selects the close button 742B, the user can later access the associated data from within a history page (e.g. history page 636 of FIG. 6) and send the associated data to a recipient from the history page, if desired.

FIG. 7C shows the device 700A shown in FIGS. 7A and 7B after the user selected the close button 742B (FIG. 7B) and then at a later time (e.g. three weeks later) interacted with an image based on visual data of a stored associated data from a history page (FIG. 6) in order to access the website address of the associated location data. However, as seen in the active screen image 740 shown in FIG. 7C, while the location data remains unchanged, the visual data from the website address has changed due to the owner or administrator of the website having changed the content/appearance (i.e. change of visual data) in the time since the storage of the associated data had occurred, thereby causing the different active screen image 740 to be generated by the device 700A when accessing the website address. If the content/appearance of the website address has not changed in the interim, then the content/appearance of the website should be substantially identical to the screenshot image 738 corresponding to the visual data of the associated data.

FIG. 7D shows a second smartphone device 700B comprising a processor 202 (FIG. 2), a display screen 704B, a computer readable storage medium 206 (FIG. 2) and input elements 708B. Displayed on the display screen 704B is the screenshot image 738 corresponding to the visual data of the associated data sent to the second device 700B from the first device 700A. Though the first device 700A sent the associated data after the owner or administrator of the website address had changed the content/appearance, since the visual data is static and unchanged by the owner or administrator, the screenshot image 738 corresponds to the active screen image 740 resembling the content/appearance of the website at the time the first user provided an activation input to the processor 102 of the first device 700A.

Figure 7E:
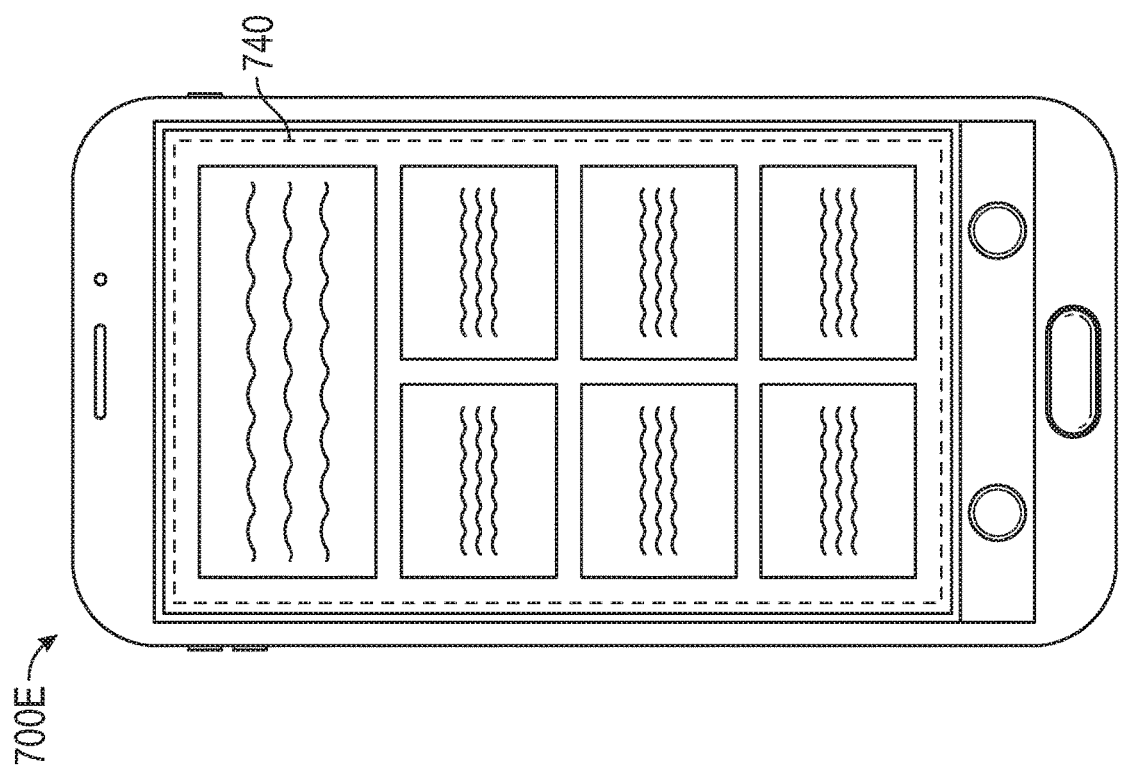
FIG. 7E shows the second device of FIG. 7D during the use case of FIGS. 7A-7D according to embodiments of the present disclosure.

FIG. 7E shows the second device 700B of FIG. 7D after the user of the second device interacted with the image 738 to launch an internet browser, automatically accessing the website address corresponding to the location data of the associated data. As discussed above, since the content/appearance of the website has changed, the active screen image 740 generated by an internet browsing software application running on the second device 700B is different than the screenshot image 738. However, as discussed above, if the content/appearance of the website was unchanged, the screenshot image 738 would be substantially identical to the active screen image 740 at the time the capture sequence was initiated.

Figure 8:
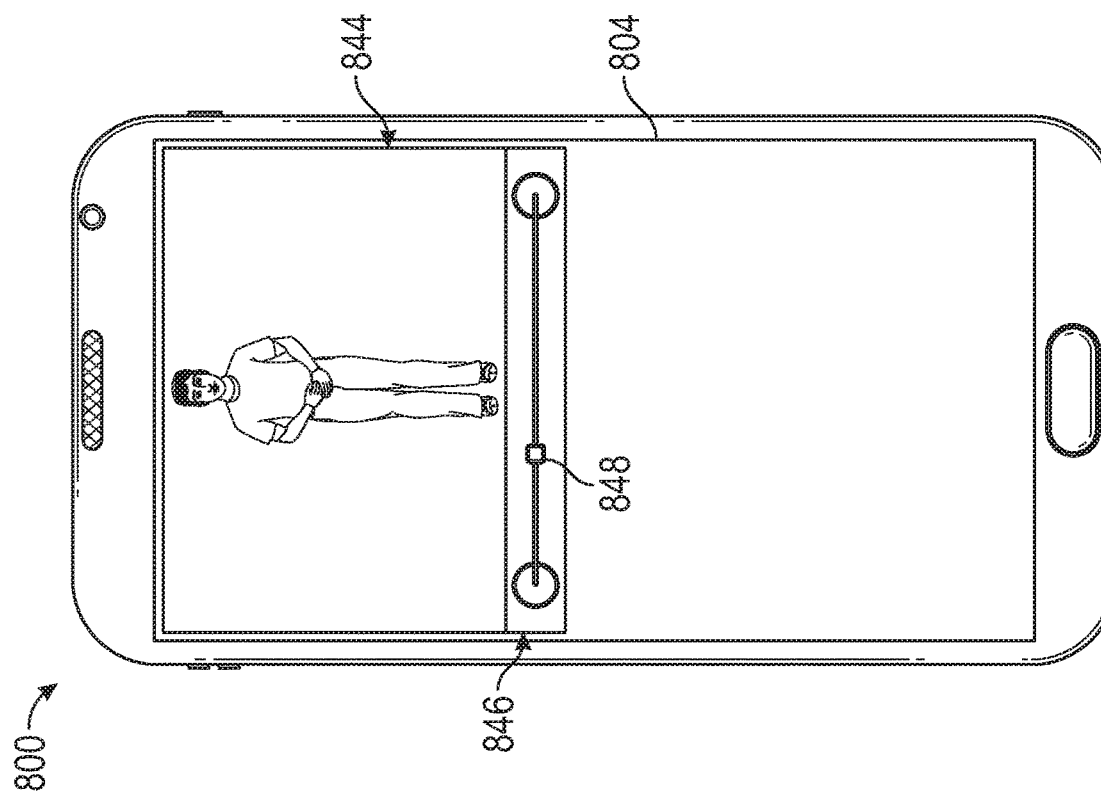
FIG. 8 shows a device according to embodiments of the present disclosure.

FIG. 8 shows a device 800 according to embodiments of the present disclosure. The device 800 comprises a display screen 804. FIG. 8 a still frame of a video 844 being played on the device 800 that is accessed from a website by an internet browser running on the device 800. During the video 844, a video progress bar 846 is displayed along with a dynamic video progress point 848. According to embodiments of the present disclosure, when a user of the device 800 provides an activation input thereby triggering a capture sequence as described above, in addition to the visual data and location data, in the associated data is also stored video progress data corresponding to the where the video progress point 848 is when the capture sequence is performed. Thus, when the computer location corresponding to the location data of the associated data is accessed (either by the same user or a recipient of the associated data), the internet browser (or other software application) is also provided with the video progress data such that the internet browser navigates to a point in the video corresponding to when in the duration of the video the capture sequence was performed, or substantially near that point.

Apparatuses according to embodiments of the present disclosure may have operating system programming that permits methods 400, 500 to be performed without additional software applications. However, it is within the scope of the present disclosure for the methods 400, 500 to be coordinated through a dedicated software application running on an apparatus (e.g. a third party application).

Figure 9A:
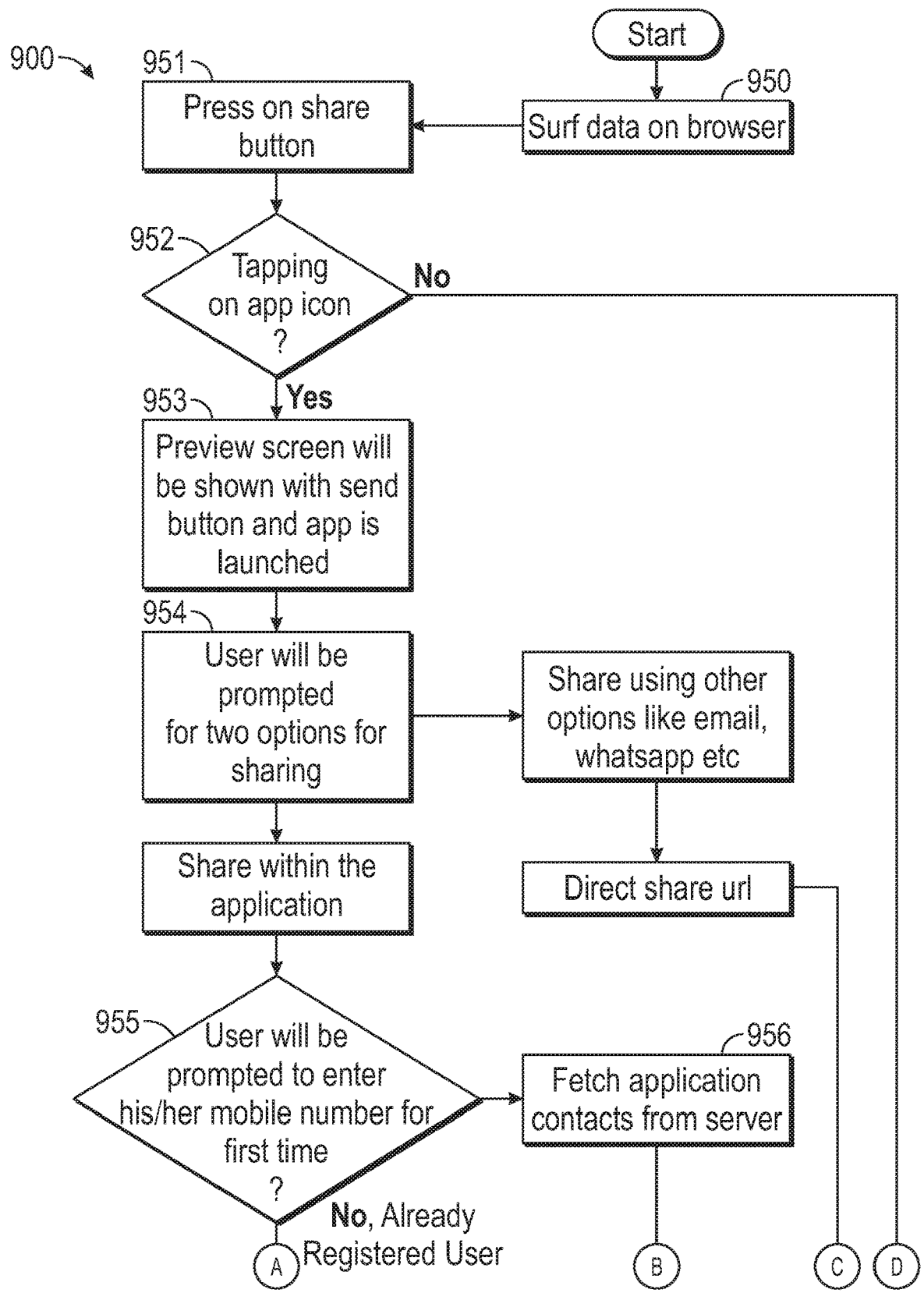
FIG. 9A shows a first portion of a work flow of a dedicated software application according to embodiments of the present disclosure.
Figure 9B:
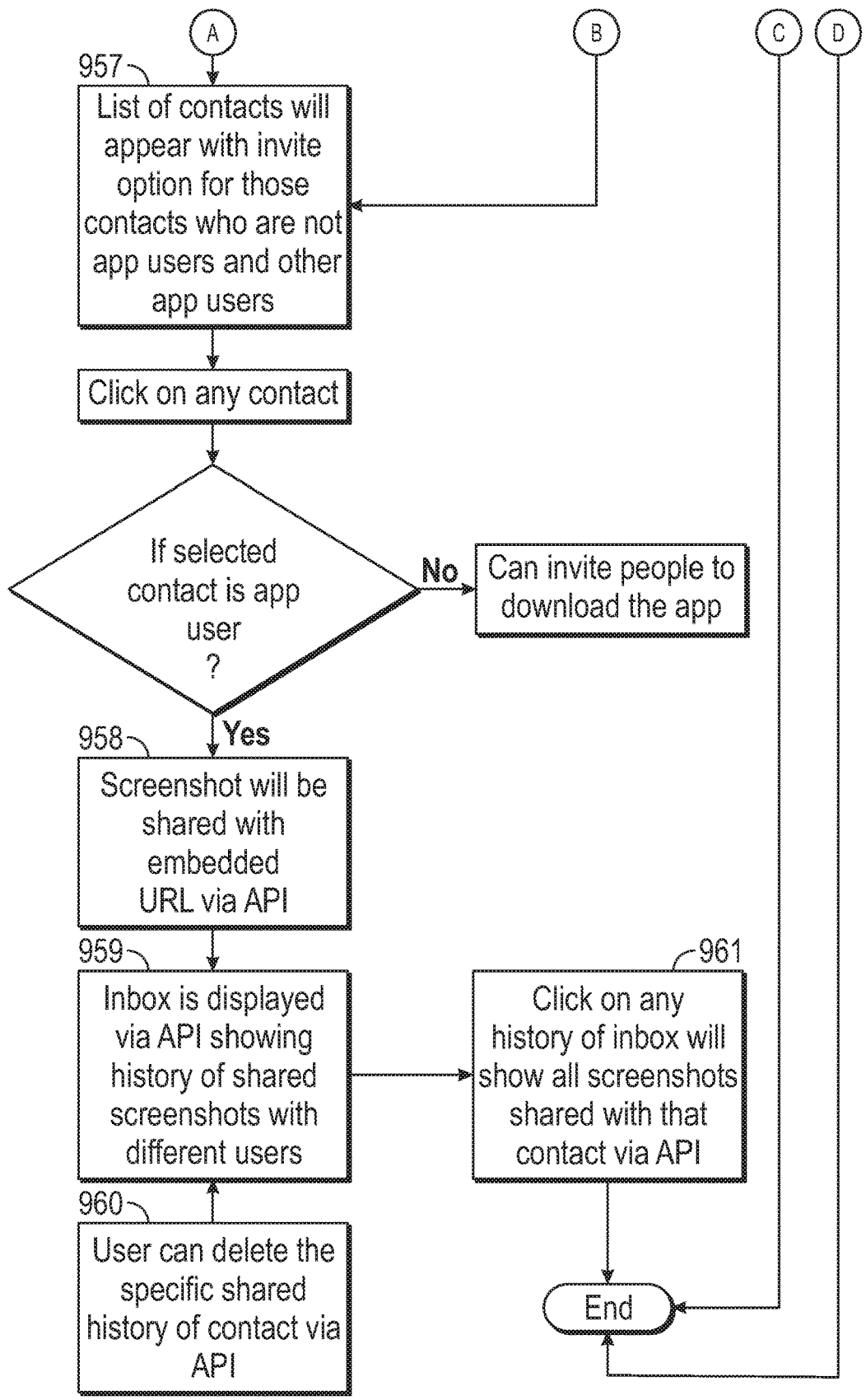
FIG. 9B shows a second portion of the work flow of FIG. 9A according to embodiments of the present disclosure.

FIG. 9A shows a flow diagram for a first portion of a work flow 900 and FIG. 9B shows a flow diagram for a second portion of the work flow 900 of a dedicated software application according to embodiments of the present disclosure. The work flow 900 starts at block 950 by a user surfing data on a browser. Then, at block 951, the user may press on a share button (or activation input) within the browser operatively connected to the dedicated software application. Then, at block 952, the user is permitted engage an icon corresponding to the dedicated software application. If the user does not engage an icon corresponding to the dedicated software application, then the work flow 900 may end. If the user does engage the icon (Yes), the work flow 900 proceeds to block 953 where a preview screen is shown with a screenshot image corresponding to the active screen image at the time of pressing the share button at block 951. At block 954, the user is prompted with options for sharing, such as, for example, sharing within the dedicated software application or sharing with a different software application such as email, WhatsApp®, and the like. If the user selects the option to share via a software application different than the dedicated software application, then the sharing is accomplished via the chosen software application and the work flow 900 exits the process.

If at block 954 the user selects to share via the dedicated software application, the work flow 900 proceeds to block 955 where it is determined whether the user is a registered user or not. If the user is not a registered a user, the user will be prompted to enter the user's mobile phone number (or other unique identifier) for the first time. Then, at block 956, the dedicated software application will fetch application contacts from a server. Then, at block 957, a list of contact options will appear for distribution selection. The user will select any one or more contacts from the list. If the selected contact(s) is not a registered user, an invitation will be sent to the selected contact to become a user of the dedicated software application. Once registered, the selected contact will be able to retrieve distributions of share data from a relational table in the server, for example, as discussed above in connection with the storing and sending method 500. If the selected contact is a registered user, at block 958 a screen shot will be shared with embedded Uniform Resource Locator "URL" (or other website address or computer location identifier protocol) via an application program interface ("API") of the dedicated software application. At block 959, the registered recipient user will be able to access the shared screenshot with embedded URL data in an inbox showing a history of shared screenshots from different users. As shown at block 960, the user can delete specific history shares at any time via the API. At block 961, the user is free to click on any history in the inbox to show all screenshots shared with that contact via API. Then the work flow 900 ends.

Figure 9C:
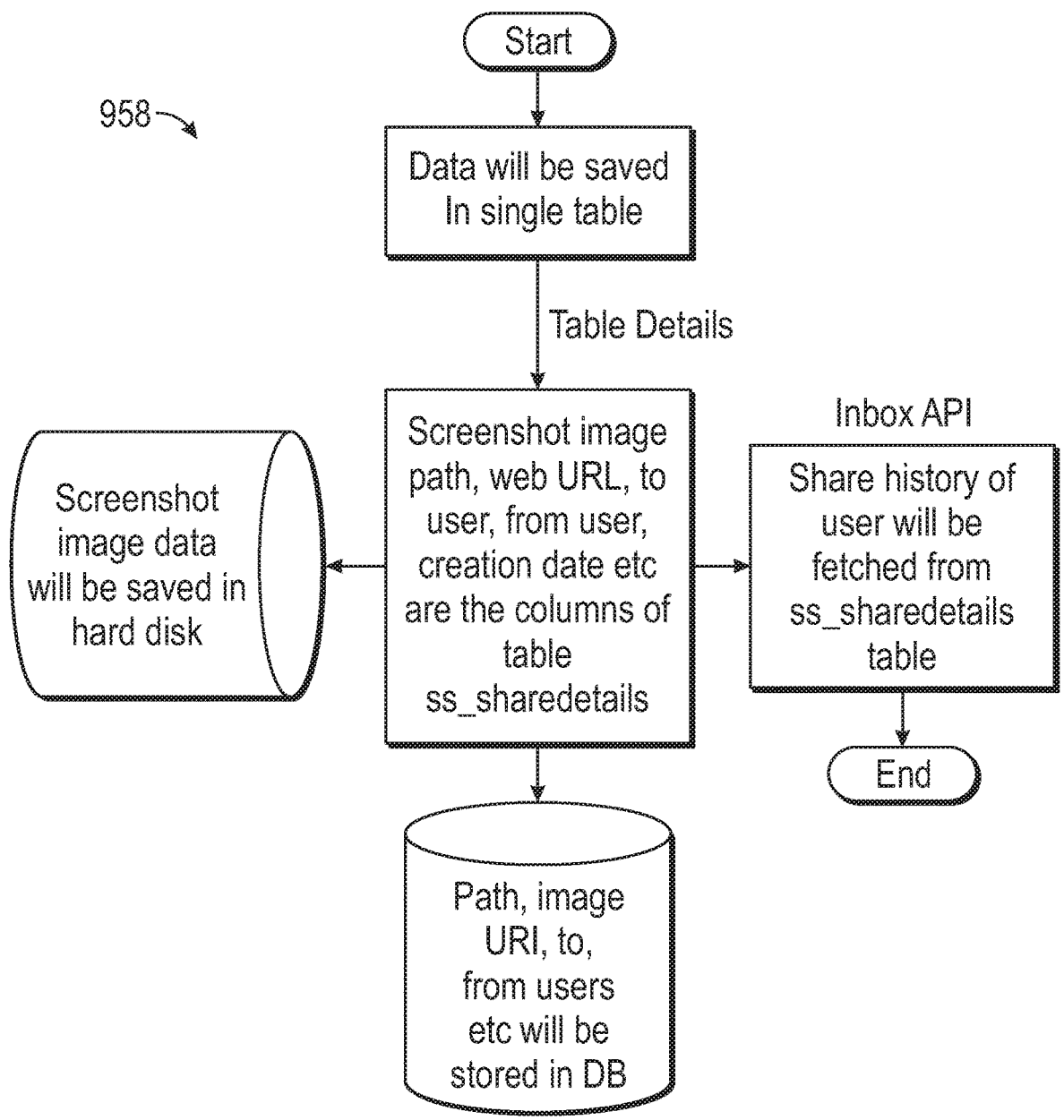
FIG. 9C shows a flow diagram of an application program interface of the second portion of the work flow of FIG. 9B according to embodiments of the present disclosure.

FIG. 9C shows a flow diagram for an exemplary application program interface utilized at block 958 (FIG. 9B) according to embodiments of the present disclosure. FIG. 9C shows that at block 958 the data is saved in a relational table corresponding to users, shared media and location data information. A relational table according to the present disclosure may include a screenshot image path field, a website URL input field, a sender user field, a recipient user field, and a creation date/time field. A single screenshot image data file can be saved in hard disk in a server in order to avoid unnecessary increase in size of database that could be attributed to multiple shares of the same media. The single data file would be maintained (and back-up duplicates for redundancy if necessary) and the media could be shared by the sharing of image file paths corresponding to the shared media in the relational table. The share history can be fetched from the relational table based on filter parameters of the relational table. The relational table may managed by MySQL™ management system or other similar relational database management system.

Methods and apparatuses according to the present disclosure may advantageously include the appropriate encryption and security measures necessary to prevent personal information from being stolen and/or inadvertently compromised. For instance, necessary encryption and security measures may be implemented to ensure that different users accessing the server are only permitted to view or access data within their permissions. Thus, associated data from other users would be inaccessible unless the appropriate instructions or permissions were granted to give users access to the associated data or other personal data (e.g. user names, passwords, financial information, contacts, history, and the like).

Methods and apparatuses according to the present disclosure may advantageously be utilized while a first user is accessing a computer location during a session established with a third party application. During the session of the third party application, location data stored during a capture sequence initiated by the first user may include one or more unique session identifiers (or session anchors). A unique session identifier may be, for example, a terminal portion of a URL address or separate metadata obtained and retrieved by the processor of the device from the computer location. When the associated data is transferred to a second user, the associated data contains the unique session identifier(s) so that the when the second user engages the image generated from the associated data the device of the second user is directed to a corresponding session at the computer location.

An exemplary use case with an established session according to embodiments of the present application may entail the following. A first user operates a first device to establish an ongoing session with a third party taxi request service application. During the session, the first user views a real-time map showing the location of a requested taxi car. The first user initiates a capture sequence according to methods discussed above, and in this case the location data contains a unique session identifier, which is stored as associated data with the visual data corresponding to the image of the real-time map at the time of the capture sequence. The first user sends the associated data to a second user, the second user engages the real-time map image corresponding to the visual data stored in the associated data, the second device launches a software application (may or may not be similar software application used by the first user to establish the ongoing session with the third party taxi request service application) that accesses the computer location corresponding to the location data and also the ongoing session corresponding to the unique session identifier. Accordingly, now the second user can view the real-time map of the third party taxi request service application which was being viewed by the first user.

Another exemplary use case with an established session according to embodiments of the present application may entail the following. A first user operates a first device to establish an ongoing session with a third party food service ordering application. The first user views a menu of items that are selectable to add to an electronic shopping cart for ordering. The first user selects one or more items for order such as, for example, a pizza pie and soda. Before checking out and ending the session, the first user initiates a capture sequence as discussed above, and in this case the location data obtains a unique session identifier and stores the unique session identifier as associated data with the visual data corresponding to the image of the menu or electronic shopping cart at the time of the capture sequence. The first user sends the associated data to a second user, the second user engages the menu or electronic shopping cart image corresponding to the visual data stored in the associated data, the second device launches a software application (may or may not be similar software application used by the first user to establish the ongoing session with the third party food service ordering application) that accesses the computer location and also the ongoing session corresponding to the unique session identifier. Accordingly, now the second user can view the menu or electronic shopping cart page of the session of the third party food service ordering application and make additional selections. The second user selects, for example, an order of wings. When the first user proceeds to check out in the third party food service ordering application, the first user checks out the "full" order of a pizza pie, soda and wings.

Administrators of third party applications can structure the sessions so that the second user does not have full access to the ongoing session of the first user. For instance, the second user may not have permission for accessing personal information, financial information, or other information of the first user accessible by the first user in the first user's established session. However, the second user would have limited viewing and/or input permissions such that the collective users or recipients of associated data have an improved user experience of the third party application(s).

Advantageously, methods and apparatuses according to the present disclosure may associate visual data with the location data of a website by recording, writing, integrating, generating or otherwise including with a generated data file the location data of the website address of an accessed page of a website that was being displayed by a device at the time a capture sequence is initiated by a user. Advantageously embodiments according to the present disclosure include associating the visual data and location data on a remote server for distribution to one or more contacts.

The term "computer location" encompasses any computer accessible destination on an internet, intranet, or other network. A server, computer, or other hardware, or a virtual server or virtual computer may be storing a data file, website page, social media page, ongoing session, or other content data at the computer location, which may be retrievable and/or capable of being interacted with by devices and methods according to the present disclosure when directed to that computer location.

The phrase "capture sequence" used herein may refer to the general process of obtaining and storing visual data and location data based on a single command from a user or processor. A capture sequence may be initiated solely based on a single activation input. Thus, no input may be needed from a user beyond the activation input in order to initiate a capture sequence. A user may advantageously capture desired data with a single activation input for later reference of the data and/or for later distribution of the data.

The term "activation input" may be any predetermined manner for inputting a command into a device. For instance, an activation input could be holding one or more input elements (e.g. button, lever, or slider) for a predetermined amount of time, actuating a series of buttons in a predetermined order, navigating a series of menu options, making a gesture on a touch sensitive display with one or more fingers, a voice command, and the like. Advantageously, the activation input may be a single action by a user to cause the performance of a capture sequence as discussed above.

The term "location data" encompasses any unique identifier for a computer location on the internet, intranet, or other network. For instance, location data for a computer location could be in the form of a domain name or a unique Uniform Resource Locator ("URL") for a particular website address such as, for example, Hypertext Transfer Protocol "HTTP" or File Transfer Protocol "FTP", or any Internet Protocol such as, for example, IPv4 or IPv6. However, other computer location identifying protocol(s) and/or nomenclature are within the scope of the present disclosure.

Advantageously, apparatuses and methods according to the present disclosure allow for a capture sequence to store visual data and location data as associated data automatically from a single activation input. The stored associated data can be sent to a recipient device substantially immediately after the association, or stored for later access by the user via the same device that stored the associated data. Or the user can later reference the associated data and decide to send the associated data at a later time.

Advantageously, apparatuses and methods according to the present disclosure allow for visual storage and sending of a computer location. Visual storage and sending allows for users not very adept at computer navigation and communication to easily store and send information with few steps. A user can look at a collection of images and quickly be able to identify which computer location the user is seeking to access based on the stored images. This collection of visual data associated with location data is able to be quickly and efficiently generated by a user because the user does not need to take many steps in order to associate the desired data. For example, a user can assemble a plurality of associated data while browsing the internet by simply "clicking a button" (activation input) whenever desired.

If desired, users of methods and apparatuses according to the present disclosure may advantageously send a portion of the obtained data of stored associated data. For example, after associated data, a first user may choose to only send the visual data to a second user without also transmitting the stored location data.

Although apparatuses and methods have been shown and described with respect to particular embodiments, the scope of the present disclosure is not limited to the particular embodiments shown and described herein. It should be appreciated by those of ordinary skill in the art that various modifications to this disclosure may be made without departing from the spirit and scope of the present disclosure. For example, while the present disclosure shows and describes smartphone devices, it should be readily understood that the principles of the present disclosure can be applied to other computer or electronic devices, such as desktop computers, laptops, virtual reality goggles, and the like.

What is claimed is:

1. A method for storing and sending a computer location comprising:
   initiating a capture sequence of a first device, wherein the first device comprises a first processor and a first display screen;
   wherein the capture sequence comprises:
   obtaining, by the first processor, visual data corresponding to an image displayed on the first display screen at the time of the initiating step;
   obtaining, by the first processor, location data corresponding to a computer location accessed by the first device;
   storing, by the first processor, the visual data and the location data as associated data such that the visual data and location data are associated with each other; and
   sending, by the first device, the associated data to a second device, wherein the second device comprises a second processor and a second display screen;
   wherein the step of initiating a capture sequence of the first device is accomplished by providing a single activation input by a user of the first device;
   wherein the step of sending, by the first device, the associated data to the second device comprises providing a single send input by the user of the first device; and
   wherein no input is necessary to be provided by the user to the first device between providing the single activation input and providing the single send input by the user to send the associated data to the second device.

2. The method according to claim 1, further comprising displaying the image on the second display screen of the second device based on the associated data.

3. The method according to claim 2, further comprising interacting, by a user of the second device, with the image, thereby causing the second device to access the computer location.

4. The method according to claim 1, further comprising obtaining, by the first processor, video progress data, wherein the video progress data indicates a particular point in time of a video provided at the computer location, and wherein the storing of the visual data and location data further comprises storing the video progress data as the associated data such that the visual data, the location data and the video progress data are associated with each other.

5. The method according to claim 1, wherein the location data contains a unique session identifier.

6. The method according to claim 1, wherein the storing of the visual data and the location data comprises generating a data file that includes the associated data and storing the data file in a storage medium of the first device.

7. The method according to claim 1, wherein the storing of the visual data and the location data comprises transmitting the associated data to a server for storage, wherein the server is remote from the first device and the second device.

8. The method according to claim 1, wherein the providing the single send input by the user of the first device comprises selecting a contact from a contact list, whereby the selecting of the contact thereby causes the first device to send the associated data to the second device without further input from the user of the first device.

9. A device for storing and sending a computer location comprising:
   a first processor;
   a first display screen;
   an input element; and
   a computer readable non-transitory storage medium;
   wherein the device is configured to perform a capture sequence based on a detection, by the processor, of a single activation input performed by a user on the input element; and
   wherein the capture sequence comprises:
   obtaining, by the processor, visual data corresponding to an image displayed on the display screen at the time of the detection of the activation input by the processor;
   obtaining, by the processor, location data corresponding to a computer location accessed by the device; and
   storing, by the processor, the visual data and the location data as associated data in the storage medium such that the visual data and the location data are associated with each other;
   wherein the storing of the visual data and the location data comprises transmitting the associated data to a server for storage, wherein the server is remote from the device;
   wherein the device is configured to send the associated data to a second device having a second processor and a second display screen when the user provides a single send input; and
   wherein no input is necessary to be provided by the user to the device between providing the single activation input and providing the single send input by the user to send the associated data to the second device.

10. The device according to claim 9, wherein the detection of the activation input by the processor causes the device to perform the capture sequence without additional input from the user beyond the activation input.

11. The device according to claim 9, wherein the device is configured to store the associated data with a plurality of other associated data.

\* \* \* \* \*